July 3, 1928.
J. L. BRACK
CULTIVATOR
Filed Jan. 21, 1927
1,675,636
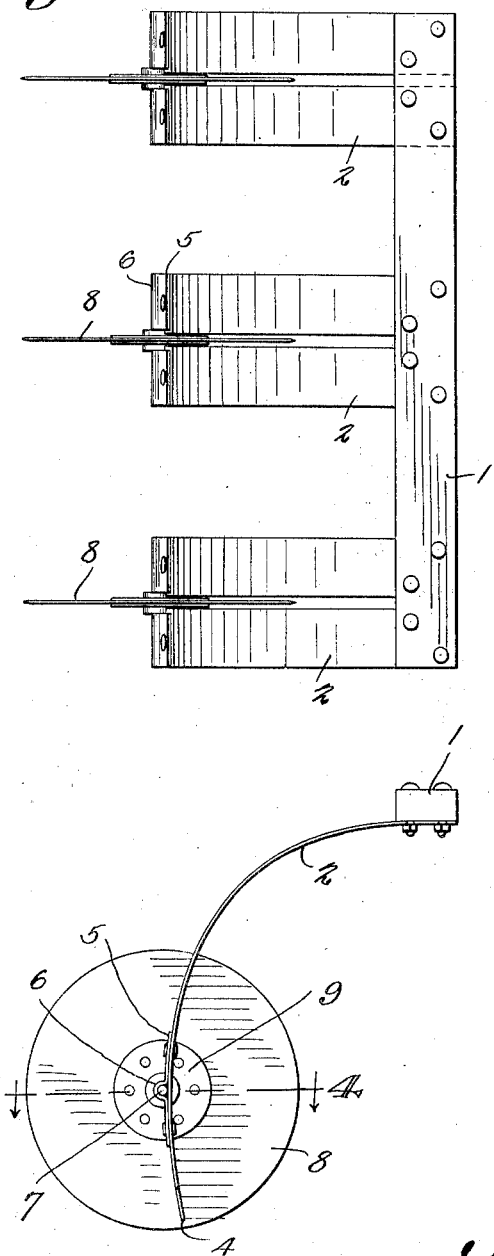
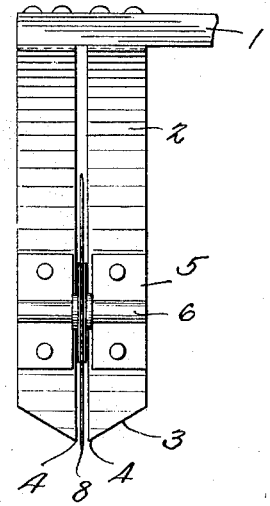
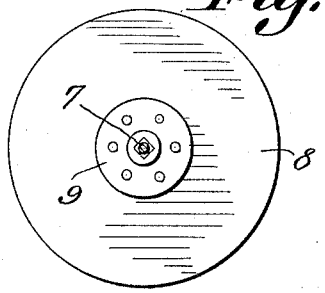
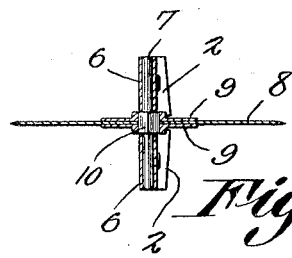
J. L. Brack, Inventor
By C. A. Snow & Co.
Attorneys Patented July 3, 1928.

1,675,636

UNITED STATES PATENT OFFICE.

JULIUS L. BRACK, OF TWINING, MICHIGAN.

CULTIVATOR.

Application filed January 21, 1927. Serial No. 162,540.

This invention relates to cultivators. As is well known to those skilled in the art cultivator teeth of the usual construction frequently spring or shift laterally when brought into contact with quack grass, weeds, etc. with the result that the field is not prepared as efficiently as desired.

It is an object of the present invention to provide the teeth of a cultivator with combined guiding and cutting disks which project below the points of the teeth so as to cut into the soil and not only sever the vegetation in the path of the disks so that the teeth can properly uproot it, but also hold the teeth against lateral shifting from the desired paths.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

In the accompanying drawings, the preferred form of the invention has been shown.

In said drawings:

Figure 1 is a plan view of a beam having several cultivator teeth extending therefrom and provided with disks for cutting into the soil and guiding the teeth.

Figure 2 is a side elevation of the structure shown in Figure 1.

Figure 3 is a rear elevation of two of the teeth and the disk associated therewith.

Figure 4 is a section on line 4—4, Figure 2.

Figure 5 is a side elevation of one of the disks.

Referring to the figures by characters of reference 1 designates a beam forming part of a cultivator and bolted or otherwise secured to this beam are spring cultivator teeth 2 arranged in pairs, the teeth of each pair having their lower or free ends beveled to provide downwardly converging edges 3 forming points 4 at the inner sides of the teeth. As shown particularly in Figure 2 the teeth are curved rearwardly or downwardly so that the points 4 will dig into and loosen the soil.

Secured to the back faces of the teeth are plates 5 offset transversely between their ends to provide bearings 6 for short shafts 7 each of which has a cutting disk 8 mounted on the central portion thereof, the disk being clamped between collars 9 mounted on the shaft of the disk. If preferred, and as shown in Figure 4 the central portion of the shaft engaged by the collars can be made angular as indicated at 10 to fit within angular openings within the collars.

Each disk 8 is of such diameter that when it is properly assembled between the teeth of one pair of will project slightly below the points of the teeth. Each disk has a cutting edge and is adapted, during the forward movement of the teeth, to cut into the soil and any vegetation in the path of the disk so that the teeth can readily loosen the soil and lift the severed vegetation. As the disks project below the teeth they will engage the soil to a greater depth than the teeth and thus prevent said teeth from shifting laterally out of the paths in which they should travel.

What is claimed is:

1. A cultivator including a pair of spaced spring strips constituting soil engaging teeth, and a combined cutting and guiding disk between and supported by said teeth, said disk being extended forwardly beyond the lower end portions of the teeth and downwardly between and below the points of the teeth.

2. A cultivator including a pair of spaced spring strips constituting soil engaging teeth, and a combined cutting and guiding disk between and supported by said teeth, said disk being extended forwardly beyond the lower end portions of the teeth and downwardly between and below the points of the teeth, the free ends of the teeth converging downwardly to provide points close to and at opposite sides of the disk.

In testimony that I claim the foregoing as my own, I have hereto affixed my signature.

JULIUS L. BRACK.